United States Patent
Lee et al.

(10) Patent No.: US 11,408,209 B2
(45) Date of Patent: Aug. 9, 2022

(54) TWO-STAGE OPEN TAILGATE

(71) Applicants: Hyundai Motor Company, Seoul (KR); Kia Motors Corporation, Seoul (KR)

(72) Inventors: Jae Seung Lee, Hwaseong-si (KR); Dae Hee Lee, Incheon (KR); Kyu Hoon Cho, Suwon-si (KR); Seung Sik Han, Hwaseong-si (KR); Yong Hyun Nam, Anyang-si (KR); Chung Sik Yim, Anyang-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 189 days.

(21) Appl. No.: 16/945,223

(22) Filed: Jul. 31, 2020

(65) Prior Publication Data

US 2021/0198925 A1 Jul. 1, 2021

(30) Foreign Application Priority Data

Dec. 31, 2019 (KR) .......................... 10-2019-0179025

(51) Int. Cl.
*E05B 83/18* (2014.01)
*B62D 25/12* (2006.01)

(52) U.S. Cl.
CPC .............. *E05B 83/18* (2013.01); *B62D 25/12* (2013.01); *E05Y 2900/516* (2013.01); *E05Y 2900/546* (2013.01)

(58) Field of Classification Search
CPC ... E05B 83/18; B62D 25/12; E05Y 2900/546; E05Y 2900/516
See application file for complete search history.

(56) References Cited

U.S. PATENT DOCUMENTS

2022/0001728 A1* 1/2022 Nania ................ B62D 33/0273

FOREIGN PATENT DOCUMENTS

| CN | 104428149 B | * 11/2016 | .............. B60J 5/101 |
|---|---|---|---|
| KR | 101581581 B1 | 12/2015 | |

* cited by examiner

*Primary Examiner* — D Glenn Dayoan
*Assistant Examiner* — Melissa Ann Bonifazi
(74) *Attorney, Agent, or Firm* — Slater Matsil, LLP

(57) ABSTRACT

A two-stage open tailgate includes a handle assembly disposed at an outer surface of a half door, wherein the half door is opened when the handle assembly performs a first operation, a full door disposed at a rear surface of the half door and opened in an integrated state with the half door when the handle assembly performs a second operation, a first striker mounted to one end of the half door, a second striker mounted to a vehicle body such that the second striker is disposed adjacent to the first striker in a closed state of the half door, a dual latch formed at one end of the full door at positions respectively corresponding to the first striker and the second striker, wherein the handle assembly and the dual latch are spaced apart from each other when the half door is opened.

20 Claims, 8 Drawing Sheets

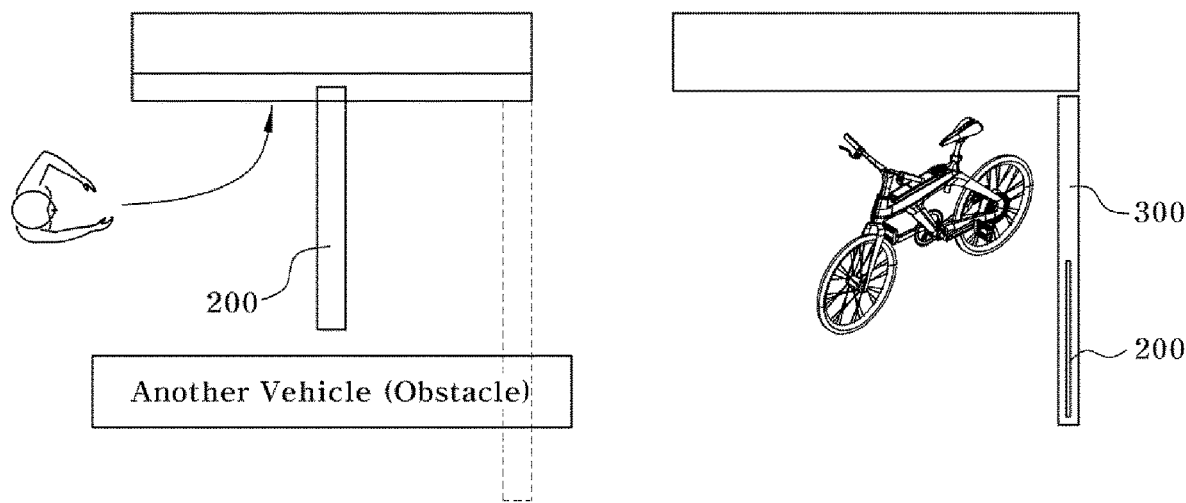
[FIG. 1]

[FIG. 2]
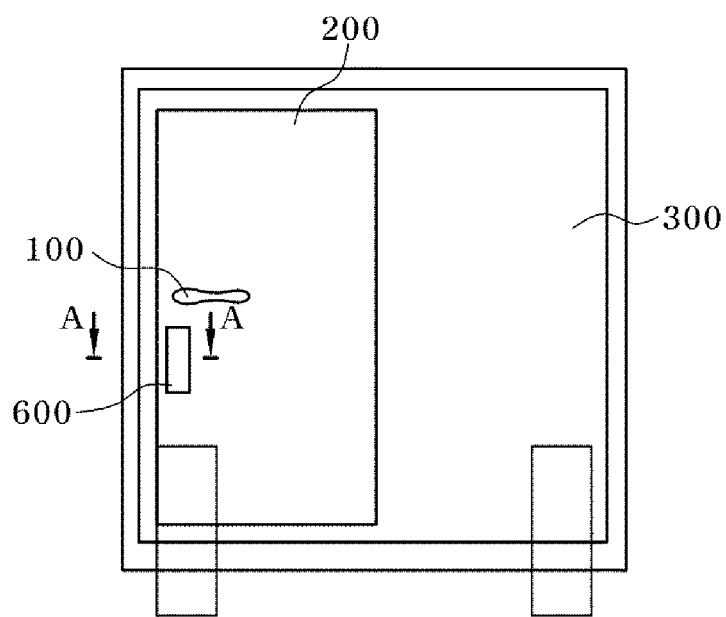
[FIG. 3]
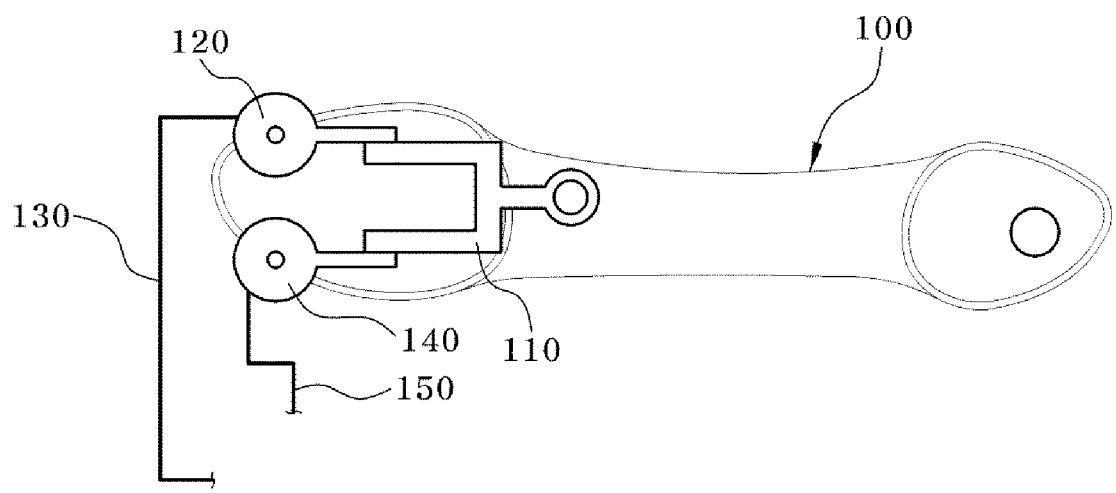

[FIG. 4]
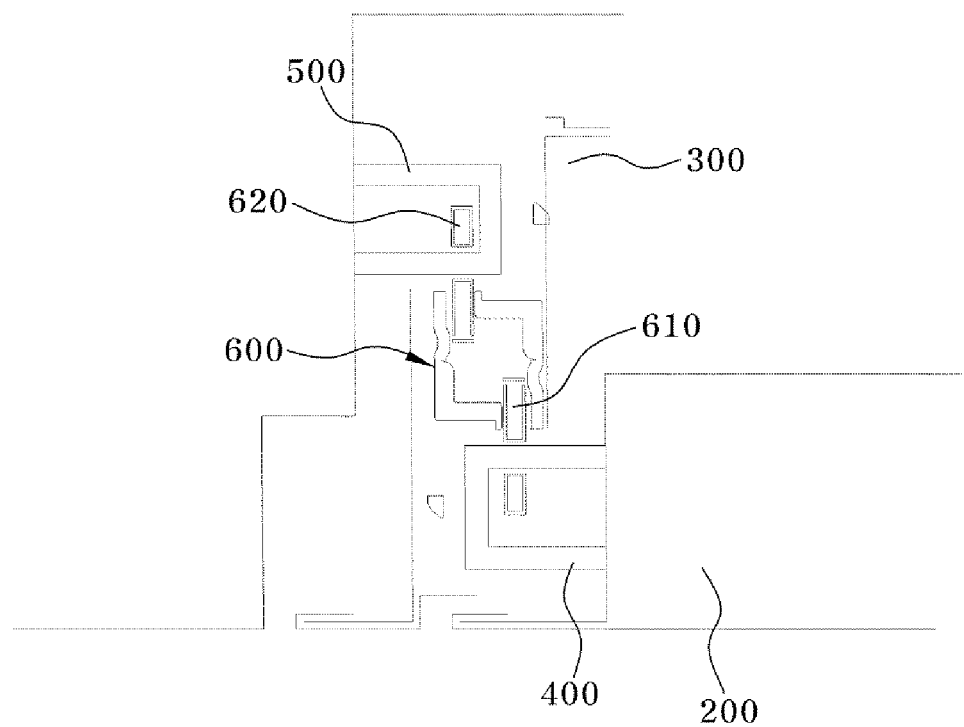

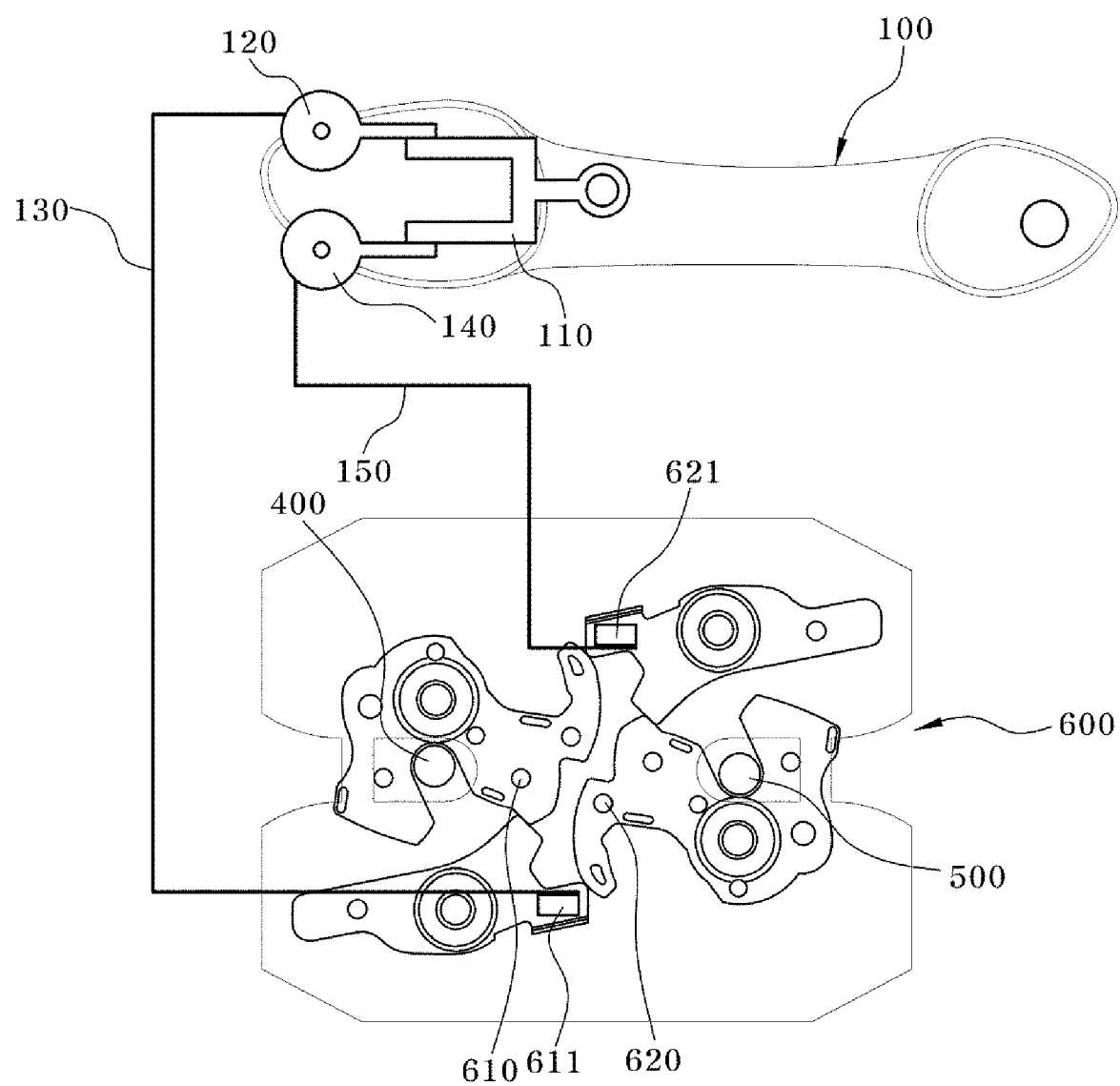
[FIG. 5]

[FIG. 6]
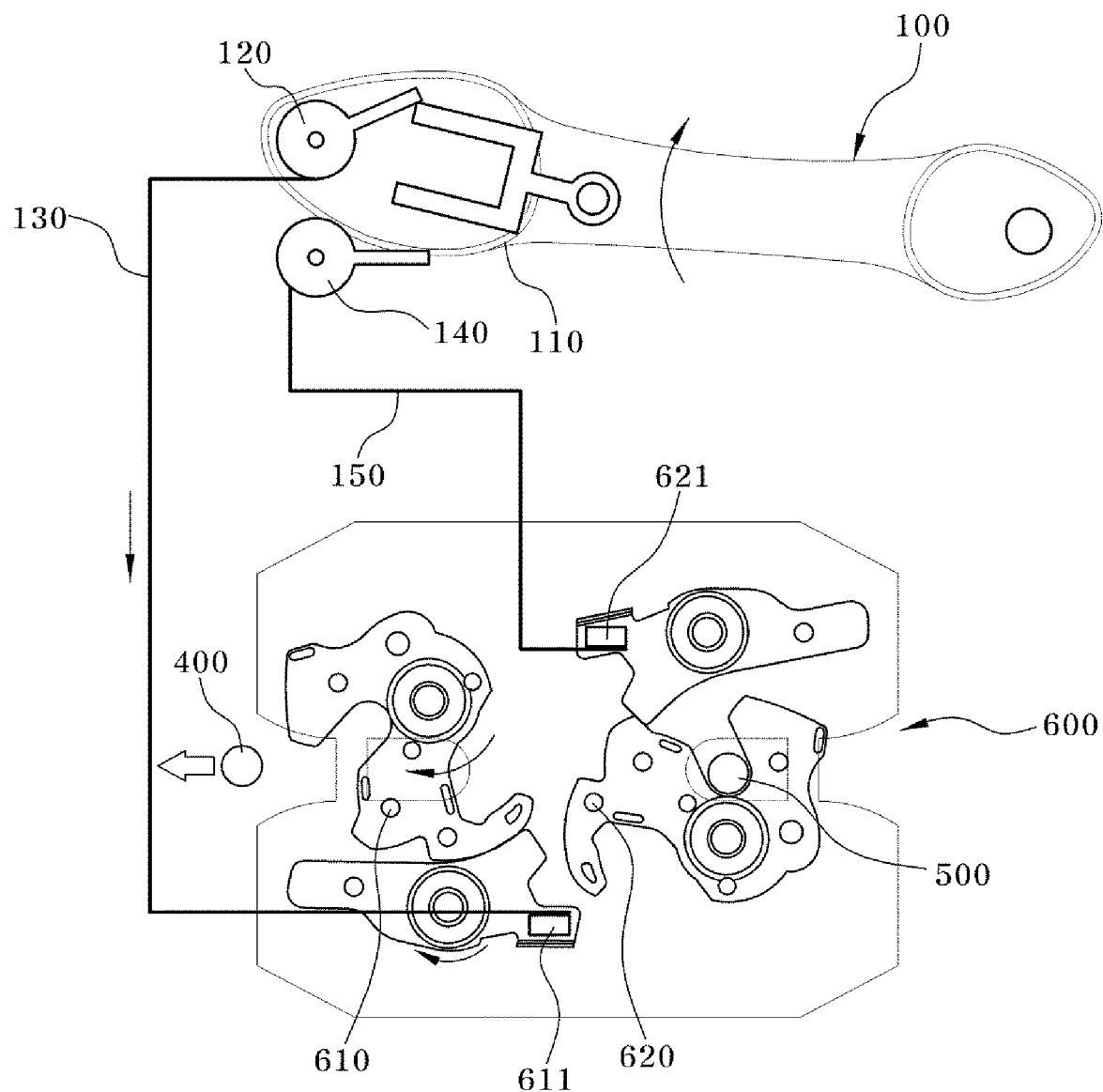

[FIG. 7]
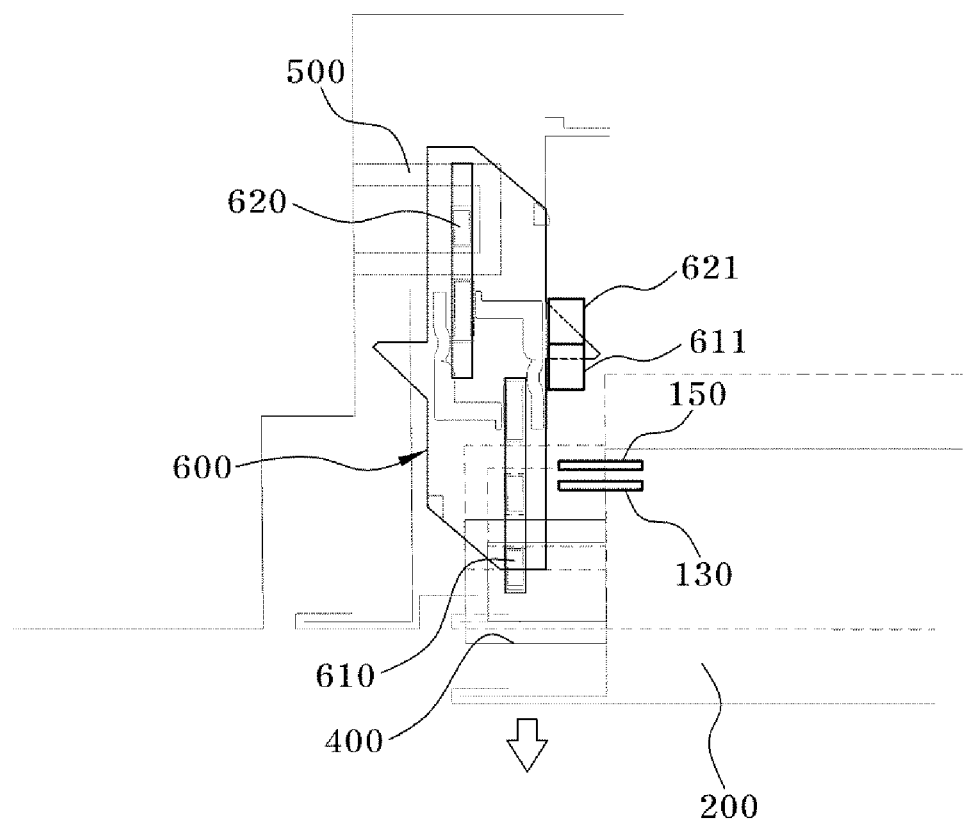

[FIG. 8]
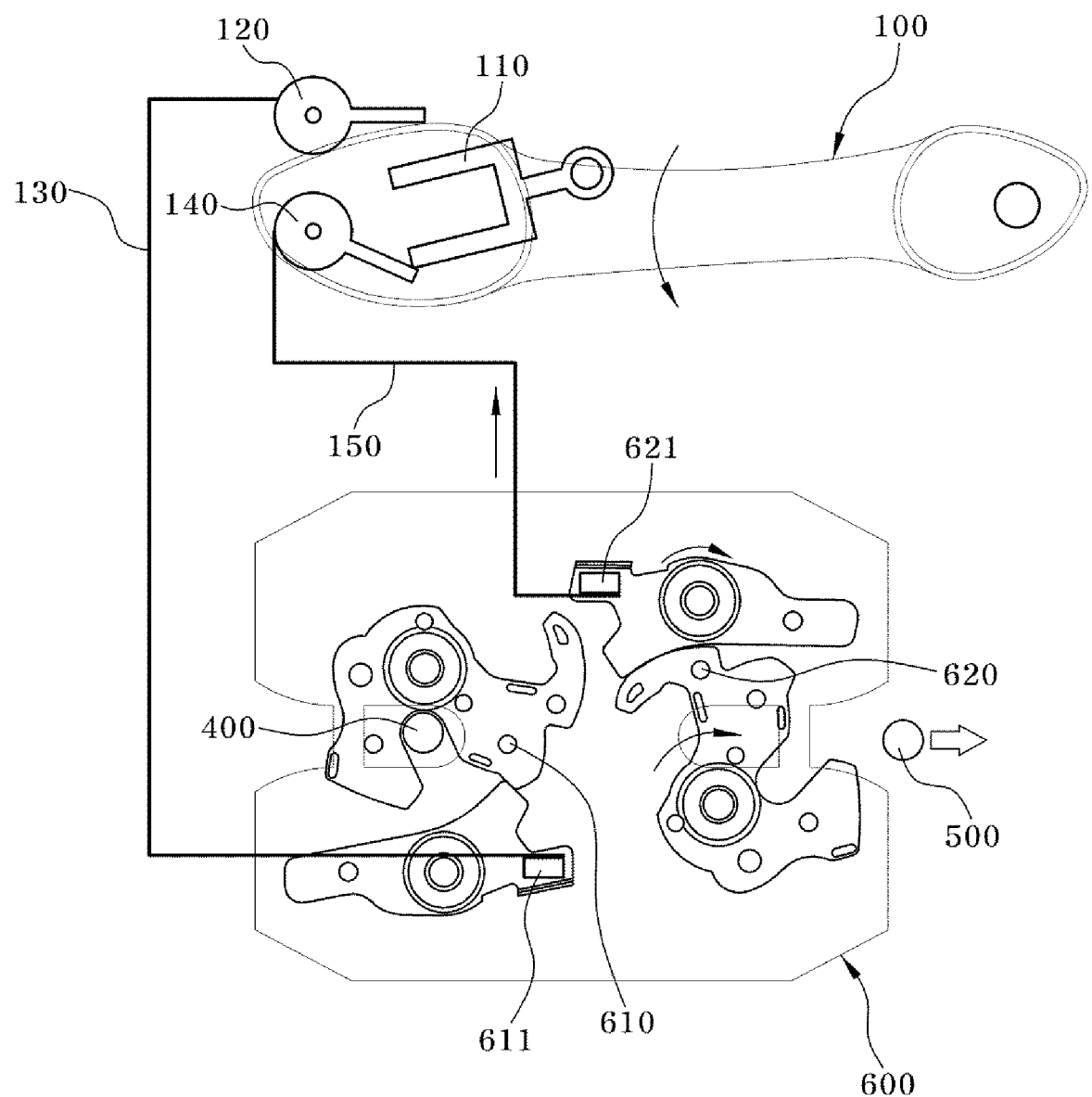

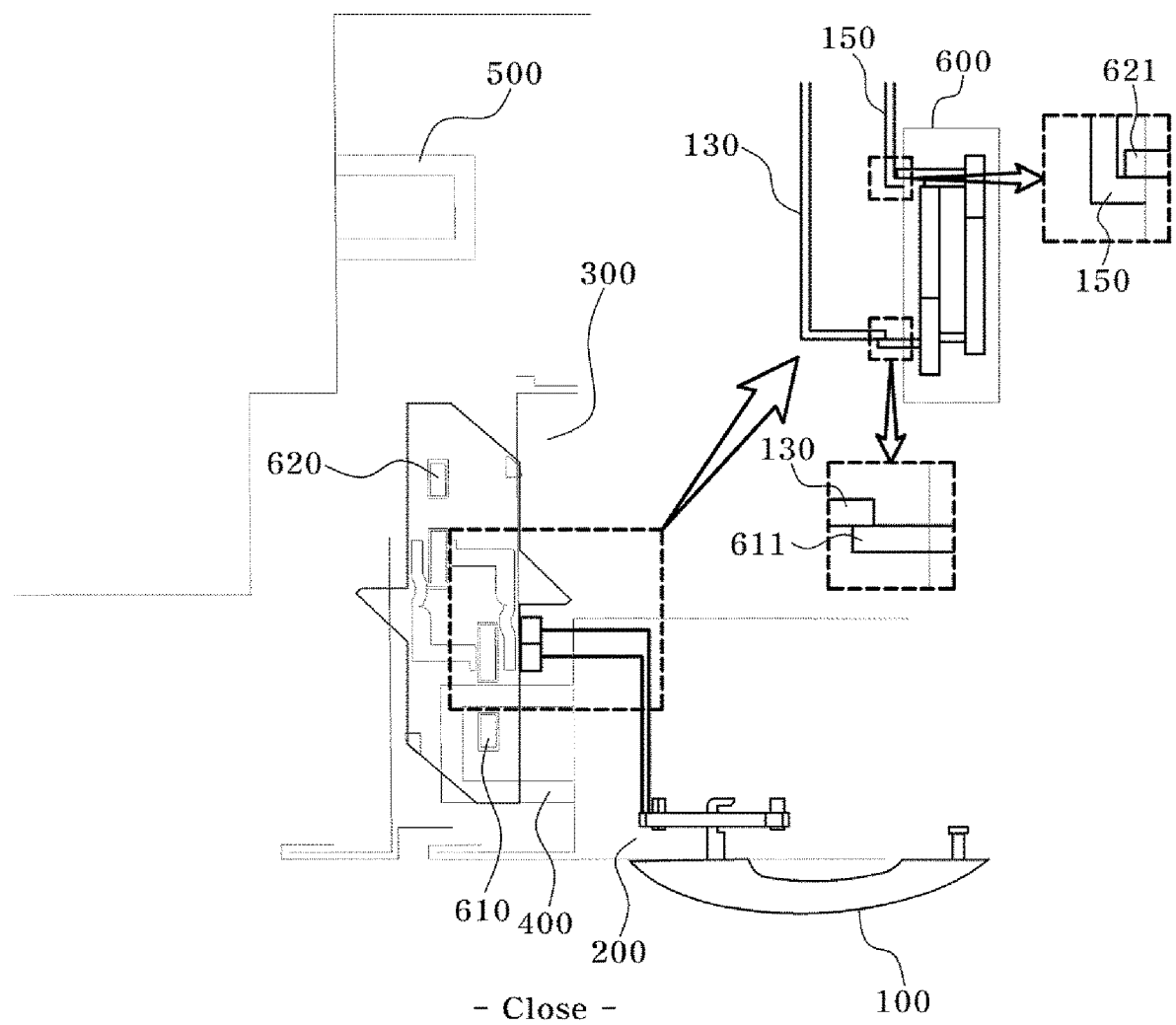
[FIG. 9]

TWO-STAGE OPEN TAILGATE

CROSS-REFERENCE TO RELATED APPLICATION

This application claims the benefit of Korean Patent Application No. 10-2019-0179025, filed on Dec. 31, 2019, which application is hereby incorporated herein by reference.

TECHNICAL FIELD

The present disclosure relates to a two-stage open tailgate.

BACKGROUND

Generally, doors installed on a vehicle perform a function of opening/closing a passenger entrance and a function of protecting passengers and the interior of the vehicle from rain or wind.

A tailgate is installed at a vehicle requiring a wide opening area at a rear side of the vehicle, such as a recreational vehicle (RV) or a van. At one end of the tailgate, a tailgate latch connected to a handle for opening/closing the tailgate is installed to promote opening/closing operation of the tailgate. Generally, such a tailgate includes a striker installed at a vehicle body, and a latch module installed at the tailgate.

In the case of a conventional tailgate latch, the latch is installed at an inner panel of the tailgate. A striker operatively connected to the latch is fixedly installed at a desired member of a vehicle body.

In this configuration, accordingly, the latch of the tailgate operates in linkage with the striker and, as such, locks or unlocks the tailgate.

Meanwhile, when the space defined between the vehicle and an obstacle is insufficient, it may be impossible to completely open the tailgate and, as such, there may be inconvenience in association with entrance or exit of passengers or loading/unloading. Therefore, a system capable of selectively opening/closing the tailgate in accordance with the side of an opening/closing space is needed.

Korean Registered Patent No. 10-1581581 forms a part of the related art.

SUMMARY

The present disclosure relates to a two-stage open tailgate. Particular embodiments relate to a two-stage open tailgate capable of selectively opening/closing a half door and a full door through application of a dual latch while selectively opening/closing the half door and the full door through change of an operation mode of a single handle assembly.

Embodiments of the present invention can solve problems associated with the prior art, and an embodiment of the present invention provides a two-stage open tailgate capable of selectively opening/closing a half door and a full door through application of a dual latch.

Another embodiment of the present invention provides a two-stage open tailgate capable of selectively opening/closing the half door and the full door through change of an operation mode of a single handle assembly.

Embodiments of the present invention are not limited to the above-described embodiments, and other embodiments of the present invention not yet described will be more clearly understood by those skilled in the art from the following detailed description. In addition, features of embodiments of the present invention may be accomplished by means defined in the appended claims and combinations thereof.

In one aspect, an embodiment of the present invention provides a two-stage open tailgate including a handle assembly disposed at an outer surface of a half door, the half door configured to be opened when the handle assembly performs a first operation, a full door disposed at a rear surface of the half door and configured to be opened in an integrated state of the half door therewith when the handle assembly performs a second operation, a first striker mounted to one end of the half door, a second striker mounted to a vehicle body such that the second striker is disposed adjacent to the first striker in a closed state of the half door, and a dual latch formed at one end of the full door at positions respectively corresponding to the first and second strikers and configured to be coupled to or released from the first striker or the second striker, wherein the handle assembly and the dual latch are spaced apart from each other when the half door is opened.

In a preferred embodiment, the dual latch may include a first pawl selectively coupled to the first striker while including a first protrusion configured to operate in linkage with the first operation of the handle assembly, and a second pawl selectively coupled to the second striker while including a second protrusion configured to operate in linkage with the second operation of the handle assembly.

In another preferred embodiment, the handle assembly may include a connector fixed, at one end thereof, to the half door and configured to be rotated during the first operation, a first rotator configured to contact the connector at one end thereof and to be rotated during the first operation, and a first link connected to one end of the first rotator such that the first link operates in linkage with rotation of the first rotator.

In still another preferred embodiment, the handle assembly may include a connector fixed, at one end thereof, to the half door and configured to be rotated during the second operation, a second rotator configured to contact the connector at one end thereof and to be rotated during the second operation, and a second link connected to one end of the second rotator such that the second link operates in linkage with rotation of the second rotator.

In yet another preferred embodiment, the first rotator may rotate in linkage with rotation of the connector during the first operation of the handle assembly, and the first link may apply tension to the first protrusion in accordance with the rotation of the first rotator.

In still yet another preferred embodiment, the first striker may be released from the first pawl during the first operation of the handle assembly, thereby allowing the half door to be opened, and the first protrusion may be spaced apart from the first link, and the second protrusion may be spaced apart from the second link in a state in which the first striker is released from the first pawl.

In still yet another preferred embodiment, the second rotator may rotate in linkage with rotation of the connector during the second operation of the handle assembly, and the second link may apply tension to the second protrusion in accordance with the rotation of the second rotator.

In still yet another preferred embodiment, the second striker may be released from the second pawl during the second operation of the handle assembly, and the first protrusion may contact the first link, and the second protrusion may contact the second link in a state in which the second striker is released from the second pawl, thereby allowing the full door to be opened.

The present invention may obtain the following effects through combination and use of the present embodiments with configurations to be described hereinafter.

In accordance with embodiments of the present invention, it may be possible to provide a two-stage open tailgate capable of selectively opening/closing the half door and the full door in a given situation through application of a dual latch, thereby maximizing space utilization. In addition, in accordance with embodiments of the present invention, it may be possible to selectively open/close the half door and the full door through change of an operation mode of the single handle assembly, thereby enhancing passenger convenience.

Other aspects and preferred embodiments of the invention are discussed infra.

It is understood that the terms "vehicle", "vehicular" and other similar terms as used herein are inclusive of motor vehicles in general such as passenger automobiles including sport utility vehicles (SUVs), buses, trucks, various commercial vehicles, watercraft including a variety of boats and ships, aircraft, and the like, and includes hybrid electric vehicles, electric vehicles, plug-in hybrid electric vehicles, hydrogen-powered vehicles and other alternative fuel (e.g. fuels derived from resources other than petroleum) vehicles. As referred to herein, a hybrid electric vehicle is a vehicle that has two or more sources of power, for example both gasoline-powered and electric-powered vehicles.

The above and other features of embodiments of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein:

FIG. 1 is a schematic view illustrating an opened state of a half door or a full door in a two-stage open tailgate according to an embodiment of the present invention;

FIG. 2 is a front view of the two-stage open tailgate according to the illustrated embodiment;

FIG. 3 is a view illustrating a handle assembly of the two-stage open tailgate according to the illustrated embodiment of the present invention;

FIG. 4 is a sectional view along line A-A of FIG. 2 illustrating a state in which the half door and the full door of the two-stage open tailgate are closed;

FIG. 5 is a plan view of the handle assembly and a dual latch in a state in which the half door and the full door of the two-stage open tailgate are closed;

FIG. 6 is a plan view illustrating a first operation of the handle assembly in the two-stage open tailgate according to the illustrated embodiment of the present invention;

FIG. 7 is a sectional view along line A-A of FIG. 2 illustrating an opened state of the half door in the two-stage open tailgate according to the illustrated embodiment of the present invention;

FIG. 8 is a plan view illustrating a second operation of the handle assembly in the two-stage open tailgate according to the illustrated embodiment of the present invention; and FIG. 9 is a sectional view along line A-A of FIG. 2 illustrating an opened state of the full door in the two-stage open tailgate according to the illustrated embodiment of the present invention.

It should be understood that the appended drawings are not necessarily to scale, presenting a somewhat simplified representation of various preferred features illustrative of the basic principles of the invention. The specific design features of embodiments of the present invention as disclosed herein, including, for example, specific dimensions, orientations, locations, and shapes will be determined in part by the particular intended application and use environment.

In the figures, reference numbers refer to the same or equivalent parts of embodiments of the present invention throughout the several figures of the drawing.

DETAILED DESCRIPTION OF ILLUSTRATIVE EMBODIMENTS

Hereinafter, embodiments will be described in detail with reference to the annexed drawings for better understanding. However, it will be apparent that the embodiments may be modified in various ways and the scope of the embodiments should not be construed as being limited to the following description. Thus, the embodiments are provided to ensure more perfect comprehension of the embodiments by one of ordinary skill in the art.

In addition, the term " . . . part", " . . . assembly", or the like described in the specification means a unit for processing at least one function or operation, and this unit may be implemented by hardware, software, or a combination thereof.

Although terms including an ordinal number, such as first or second, may be used in the specification to describe common elements, these elements are not limited to the terms, and the terms are used only for the purpose of discriminating one element from other elements. Furthermore, these terms are not intended to imply that the elements so described must be in a given sequence.

In addition, in the specification, "height direction" means a height direction of a vehicle, and "width direction" means an outward lateral direction of the vehicle.

Furthermore, in the specification, "clockwise direction" and "counterclockwise direction" mean rotation directions when viewed in the drawings.

In addition, in the specification, it will be understood that, when an element is referred to as being "on" or "over" another element, it can be directly on or over the other element or can be indirectly formed such that an intervening element is also present. Furthermore, when an element is referred to as being "on" or "under" another element, it can be directly on or under the other element or can be indirectly formed such that an intervening element is also present.

In addition, the "tailgate" described in the specification includes both a front tailgate and a rear tailgate. The specification is prepared in association with one end of the tailgate.

Furthermore, the "door" described in the specification includes all of a door configured to be opened in forward and rearward directions of the vehicle and a door configured to be opened in opposite width directions of the vehicle. The specification is prepared in association with one end of the door configured to be opened in forward and rearward directions of the vehicle.

The present invention relates to a two-stage open tailgate. FIG. 1 illustrates an opened state of a half door or a full door in a two-stage open tailgate according to an embodiment of the present invention. FIG. 2 shows a front view of the two-stage open tailgate according to the illustrated embodiment.

Referring to FIGS. 1 and 2, the two-stage open tailgate according to the illustrated embodiment of the present invention includes a handle assembly 100 disposed at an outer surface of a half door 200, the half door 200 configured to be opened when the handle assembly 100 performs a first operation, and a full door 300 configured to be opened in an integrated state of the half door 200 therewith when the handle assembly 100 performs a second operation. The two-stage open tailgate further includes a first striker 400 (FIG. 4) mounted to one end of the half door 200, and a second striker 500 (FIG. 4) mounted to a vehicle body such that the second striker 500 is disposed adjacent to the first striker 400 in a closed state of the half door 200. In addition, the two-stage open tailgate includes a dual latch 600 formed at one end of the full door 300 at positions respectively corresponding to the first and second strikers 400 and 500, and configured to be coupled to or released from the first striker 400 or the second striker 500. When the half door 200 is opened, the handle assembly 100 and the dual latch 600 are spaced apart from each other.

The handle assembly 100 may be disposed at the outer surface of the half door 200. Preferably, the handle assembly 100 may be disposed at a central portion of the half door 200 in a height direction of the half door 200. In addition, the handle assembly 100 may be connected to the dual latch 600 such that, when the user manipulates the handle assembly 100, the dual latch 600 is released, thereby allowing the half door 200 or the full door 300 to be easily released from the vehicle body.

It may be possible to open or close the half door 200 and/or the full door 300 using only the single handle assembly 100 mounted to the half door 200 and, as such, the number and weight of elements associated with the handle assembly 100 and manufacturing costs may be reduced.

The handle assembly 100 may be configured to perform two-stage operations. When the handle assembly 100 performs the first operation, the half door 200 may be opened. On the other hand, when the handle assembly 100 performs the second operation in a completely closed state of the half door 200, the full door 300 and the half door 200 may be opened in an integrated manner through rotation.

The half door 200 may be configured to be opened during the first operation of the handle assembly 100. The half door 200 may be installed at an upper surface of the full door 200. Preferably, the half door 200 may be hinged, at one end thereof, to a central portion of the full door 300 in a width direction of the full door 300. The other end of the half door 200 may be rearwardly pulled or forwardly pushed about a hinge in a longitudinal direction of the vehicle body.

Even in a narrow space in which the full door 300 cannot be completely opened, the half door 200 can be completely opened or closed. Accordingly, it may be possible to enhance convenience of entrance and exit of passengers, and to easily secure a space for entrance and exit of passengers.

The full door 300 may be disposed at a rear surface of the half door 200. The full door 300 may be configured to be opened in an integrated state of the half door 200 therewith during the second operation of the handle assembly 100. Preferably, the half door 200 and the full door 300 may be configured to be opened in an integrated manner through rotation when the handle assembly 100 performs the second operation in a completely closed state of the half door 200.

The full door 300 may be hinged, at one end thereof, to the vehicle body. The other end of the full door 300 may be rearwardly pulled or forwardly pushed about a hinge in a longitudinal direction of the vehicle body. When the full door 300 is completely opened, all areas of a vehicle opening may be opened and, as such, there may be an effect in that a burden having a great volume can be easily loaded.

The first striker 400 may be mounted to one end of the half door 200. Preferably, the first striker 400 may be fixedly installed at one end of the half door beneath the handle assembly 100 in a height direction of the half door 200.

The second striker 500 may be mounted to the vehicle body such that the second striker 500 is disposed adjacent to the first striker 400 in a closed state of the half door 200. Preferably, the second striker 500 may be fixedly installed at the vehicle body beneath the handle assembly 100 in a height direction of the vehicle body.

The dual latch 600 may be formed at one end of the full door 500 at positions respectively corresponding to the first and second strikers 400 and 500. The dual latch 600 may be configured to be coupled to or released from the first striker 400 or the second striker 500.

Preferably, in a closed state of the half door 200, the first striker 400 and the dual latch 600 may be maintained in a coupled state. As the first striker 400 is released from the dual latch 600, the half door 200 may be opened.

Preferably, in a closed state of the full door 300, the second striker 500 and the dual latch 600 may be maintained in a coupled state. As the second striker 500 is released from the dual latch 600, the full door 300 may be opened.

When the half door 200 is opened, the handle assembly 100 and the dual latch 600 may be spaced apart from each other. Preferably, the handle assembly 100 and the dual latch may be in contact with each other in a closed state of the half door 200, and may be spaced apart from each other as the half door 200 is opened.

Since the dual latch 600 configured to perform door opening/closing is installed at the full door 300, and the half door 200 mounted with the handle assembly 100 is installed at the full door 300, it may be possible to enable entrance/exit of passengers and loading/unloading of a burden in a narrow space.

FIG. 3 illustrates the handle assembly 100 of the two-stage open tailgate according to the illustrated embodiment of the present invention.

Referring to FIG. 3, the handle assembly 100 of the two-stage open tailgate according to the illustrated embodiment of the present invention may include a connector no fixed, at one end thereof, to the half door 200 and configured to be rotated during a first operation, a first rotator 120 configured to contact the connector no at one end thereof and to be rotated during the first operation, and a first link 130 connected to one end of the first rotator 120 such that the first link 130 operates in linkage with rotation of the first rotator 120.

In addition, the handle assembly 100 may include the connector no fixed, at one end thereof, to the half door 200 and configured to be rotated during a second operation, a second rotator 140 configured to contact the connector no at one end thereof and to be rotated during the second operation, and a second link 150 connected to one end of the second rotator 140 such that the second link 150 operates in linkage with rotation of the second rotator 140.

The handle assembly 100 may be fixed, at one end thereof, to the outer surface of the half door 200 such that the other end of the handle assembly 100 is rotatable. Preferably, a handle spring having elasticity may be formed at one end of the handle assembly 100 such that the handle assembly 100 returns to an original position thereof after the first operation or the second operation.

The first operation may be an operation of rotating the other end of the handle assembly 100 clockwise. The second operation may be an operation of rotating the other end of the handle assembly 100 counterclockwise.

The connector no is rotatably mounted, at one end thereof, to the half door 200 such that the connector 100 is rotated during the first operation or the second operation. Preferably, one end of the connector no is rotatably mounted to the half door 200 by a pin. The other end of the connector no may be configured to have a U shape and to be disposed adjacent to the first rotator 120 and the second rotator 140.

During the first operation of the handle assembly 100, the other end of the connector no rotates clockwise about one end of the connector 110. On the other hand, during the second operation of the handle assembly 100, the other end of the connector no rotates counterclockwise about one end of the connector 110.

A connector spring having elasticity may be formed at one end of the connector 110 such that the connector no may return to an original position thereof after the first operation or the second operation.

The first rotator 120 may be configured to contact the connector no at one end thereof such that the first rotator 120 rotates during the first operation of the handle assembly 100. Preferably, one end of the first rotator 120 may be rotatably mounted to the half door 200 by a pin, and the other end of the first rotator 120 may contact the other end of the connector 110.

A rotator spring having elasticity may be formed at one end of the first rotator 120 such that the first rotator 120 may return to an original position thereof after the first operation. When the connector no rotates clockwise in accordance with the first operation of the handle assembly 100, the connector no may rotate the first rotator 120 counterclockwise.

The first link 130 may be connected to one end of the first rotator 120 such that the first link 130 operates in linkage with rotation of the first rotator 120. Preferably, the first link 130 may be connected, at one end thereof, to the first rotator 120 while being connected, at the other end thereof, to the dual latch 600 such that the first link 130 may transmit the first operation of the handle assembly 100 to the dual latch 600.

The second rotator 140 may be configured to contact the connector no at one end thereof such that the second rotator 140 rotates during the second operation of the handle assembly 100. Preferably, one end of the second rotator 140 may be rotatably mounted to the half door 200 by a pin, and the other end of the second rotator 140 may contact the other end of the connector no.

A rotator spring having elasticity may be formed at one end of the second rotator 140 such that the second rotator 140 may return to an original position thereof after the second operation. When the connector no rotates counterclockwise in accordance with the second operation of the handle assembly 100, the connector no may rotate the second rotator 140 clockwise.

The second link 150 may be connected to one end of the second rotator 140 such that the second link 150 operates in linkage with rotation of the second rotator 140. Preferably, the second link 150 may be connected, at one end thereof, to the second rotator 140 while being connected, at the other end thereof, to the dual latch 600 such that the second link 140 may transmit the second operation of the handle assembly 100 to the dual latch 600.

In other words, the first rotator 120 may be configured to be connected to the dual latch 600 via the first link 130, and the second rotator 140 may be configured to be connected to the dual latch 600 via the second link 150. In accordance with these configurations, it may be possible to selectively open/close the half door 200 and the full door 300 through change of an operation mode of the handle assembly 100 and, as such, there may be an effect in that convenience of passengers may be enhanced.

FIG. 4 shows a sectional view along line A-A of FIG. 2 illustrating a state in which the half door 200 and the full door 300 of the two-stage open tailgate are closed. FIG. 5 shows a plan view of the handle assembly 100 and the dual latch 600 in a state in which the half door 200 and the full door 300 of the two-stage open tailgate are closed.

Referring to FIGS. 4 and 5, the dual latch 600 of the two-stage open tailgate according to the illustrated embodiment of the present invention may include a first pawl 610 selectively coupled to the first striker 400 while including a first protrusion 611 configured to operate in linkage with the first operation of the handle assembly 100. The dual latch 600 may also include a second pawl 620 selectively coupled to the second striker 500 while including a second protrusion 621 configured to operate in linkage with the second operation of the handle assembly 100.

The first pawl 610 may be configured to be selectively coupled to the first striker 400 while including the first protrusion 611 configured to operate in linkage with the first operation of the handle assembly 100. The first protrusion 611 may be formed at one end of the first pawl 610. Preferably, the first protrusion 611 may be configured to contact the first link 130 in a closed state of the half door 200.

During the first operation of the handle assembly 100, the first rotator 120 rotates counterclockwise, thereby causing the first link 130 to move downwards in a height direction thereof. As the first link 130 moves downwards, tension may be applied to the first protrusion 611.

When the first pawl 610 is coupled to the first striker 400, the first pawl 610 may maintain the half door 200 in a closed state. On the other hand, when the first pawl 610 is released from the first striker 400, the first pawl 610 may allow the half door 200 to be opened. Preferably, a groove for receiving the first striker 400 is formed at the first pawl 610 and, as such, the first striker 400 may lock the half door 200.

The second pawl 620 may include a second protrusion 621 configured to operate in linkage with the second operation of the handle assembly 100. The second pawl 620 may be configured to be selectively coupled to the second striker 500. The second protrusion 621 may be formed at one end of the second pawl 620. Preferably, the second protrusion 621 may be configured to contact the second link 150 in a closed state of the half door 200.

When the handle assembly 100 performs the second operation, the second rotator 140 is rotated clockwise, thereby causing the second link 150 to move upwards in a height direction thereof. As the second link 150 moves upwards, tension may be applied to the second protrusion 621.

When the second pawl 620 is coupled to the second striker 500, the second pawl 620 may maintain the full door 300 in a closed state. On the other hand, when the second pawl 620 is released from the second striker 500, the second pawl 620 may allow the full door 300 to be opened. Preferably, a groove for receiving the second striker 400 is formed at the second pawl 620 and, as such, the second striker 500 may lock the full door 300.

In a state in which both the half door 200 and the full door 300 are closed, the groove of the first pawl 610 in which the first striker 400 is received and the groove of the second pawl 620 in which the second striker 500 is received may be disposed such that openings thereof are directed in opposite directions, respectively.

The first and second pawls 610 and 620 of the dual latch 600 may be disposed not to interfere with each other during rotation thereof. Preferably, as shown in FIG. 5, the first pawl 610 and the second pawl 620 are disposed to be spaced apart from each other, and are configured such that only the first pawl 610 rotates in accordance with the first operation of the handle assembly 100, and only the second pawl 620 rotates in accordance with the second operation of the handle assembly 100.

FIG. 6 is a plan view illustrating the first operation of the handle assembly 100 in the two-stage open tailgate according to an illustrated embodiment of the present invention.

Referring to FIG. 6, in the two-stage open tailgate according to the illustrated embodiment of the present invention, the first rotator 120 may be rotated in linkage with rotation of the connector no during the first operation of the handle assembly 100. As a result, the first link 130 may apply tension to the first protrusion 611.

In accordance with the first operation of the handle assembly 100, the other end of the connector no may rotate clockwise about one end of the connector no. Accordingly, the first rotator 120 contacting the other end of the connector no may rotate counterclockwise. The first link 130 may be connected, at one end thereof, to the first rotator 120 while being connected, at the other end thereof, to the first protrusion 611.

As a result, the first link 130 moved downwards in accordance with rotation of the first rotator 120 may apply tension to the first protrusion 611. When the first protrusion 611 is moved downwards by tension from the first link 130 applied thereto, the first pawl 610 may be released from the first striker 400.

FIG. 7 shows a sectional view along line A-A of FIG. 2 illustrating an opened state of the half door 200 in the two-stage open tailgate according to an illustrated embodiment of the present invention.

Referring to FIG. 7, in the two-stage open tailgate according to the illustrated embodiment of the present invention, the first striker 400 may be released from the first pawl 610 during the first operation of the handle assembly 100 and, as such, the half door 200 may be allowed to be opened. In this state, the first protrusion 611 may be spaced apart from the first link 130, and the second protrusion 621 may be spaced apart from the second link 150.

In a state in which the first striker 400 is released from the first pawl 610 in accordance with the first operation of the handle assembly 100, it may be possible to completely open the half door 200 by pulling the handle assembly 100 in a rearward direction of the vehicle. In a closed state of the half door 200, the first protrusion 611 may be in contact with the first link 130, and the second protrusion 621 may be in contact with the second link 150.

As the half door 200 is opened, the first protrusion 611 may be spaced apart from the first link 130, and the second protrusion 621 may be spaced apart from the second link iso. Accordingly, in an opened state of the half door 200, the second link 150 cannot apply tension to the second protrusion 612 even when the handle assembly 100 performs the second operation. That is, in the opened state of the half door 200, the full door 300 is prevented from being opened even when the handle assembly 100 performs the second operation.

After the first operation of the handle assembly 100, the connector no may return to an original position thereof by elasticity of the connector spring thereof. As the half door 200 is closed, the first striker 400 may rotate the first pawl 610. Preferably, the first striker 400 is inserted into the first pawl 610, thereby causing the half door 200 to be locked. As the half door 200 is closed, the first protrusion 611 and the first link 130, which have been spaced apart from each other, and the second protrusion 621 and the second link iso, which have been spaced apart from each other, may again come into contact with each other.

FIG. 8 shows a plan view illustrating the second operation of the handle assembly 100 in the two-stage open tailgate according to an illustrated embodiment of the present invention.

Referring to FIG. 8, in the two-stage open tailgate according to the illustrated embodiment of the present invention, the second rotator 140 may be rotated in linkage with rotation of the connector no during the second operation of the handle assembly 100. As a result, the second link 150 may apply tension to the second protrusion 621.

In accordance with the second operation of the handle assembly 100, the other end of the connector no may rotate counterclockwise about one end of the connector no. Accordingly, the second rotator 140 contacting the other end of the connector no may rotate clockwise. The second link 150 may be connected, at one end thereof, to the second rotator 140 while being connected, at the other end thereof, to the second protrusion 621.

As a result, the second link 150 moved upwards in accordance with rotation of the second rotator 140 may apply tension to the second protrusion 621. When the second protrusion 621 is moved upwards by tension from the second link 150 applied thereto, the second pawl 620 may be released from the second striker 500.

FIG. 9 shows a sectional view along line A-A of FIG. 2 illustrating an opened state of the full door 300 in the two-stage open tailgate according to an illustrated embodiment of the present invention.

Referring to FIG. 9, in the two-stage open tailgate according to the illustrated embodiment of the present invention, the second striker 500 may be released from the second pawl 620 during the second operation of the handle assembly 100 and, as such, the full door 300 may be allowed to be opened. In this state, the first protrusion 611 may be in contact with the first link 130, and the second protrusion 621 may be in contact with the second link iso, and, as such, the full door 300 may be allowed to be opened.

In a state in which the second striker 500 is released from the second pawl 620 in accordance with the second operation of the handle assembly 100, it may be possible to completely open the full door 300 by pulling the handle assembly 100 in a rearward direction of the vehicle. While the full door 300 transitions from a closed state to an opened state, the first protrusion 611 may be in contact with the first link 130, and the second protrusion 621 may be in contact with the second link 150.

After the second operation of the handle assembly 100, the connector no may return to an original position thereof by elasticity of the connector spring thereof.

As the full door 300 is closed, the second striker 500 may rotate the second pawl 620. Preferably, the second striker 500 may be inserted into the second pawl 620, thereby causing the second pawl 620 to be coupled to the second striker 500. As a result, the full door 300 may be locked.

Briefly, in accordance with embodiments of the present invention, it may be possible to provide a two-stage open tailgate capable of selectively opening/closing the half door 200 and the full door 300 in a given situation through application of a dual latch, thereby maximizing space utilization. In addition, in the two-stage open tailgate, it may be possible to selectively open/close the half door 200 and the full door 300 through change of an operation mode of the single handle assembly 100, thereby enhancing passenger convenience.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A two-stage open tailgate comprising:
    a handle assembly disposed at an outer surface of a half door, wherein the half door is configured to be opened when the handle assembly performs a first operation;
    a full door disposed at a rear surface of the half door and configured to be opened in an integrated state with the half door when the handle assembly performs a second operation;
    a first striker mounted to one end of the half door;
    a second striker configured to be mounted to a vehicle body such that the second striker is disposed adjacent to the first striker in a closed state of the half door; and
    a dual latch formed at one end of the full door at positions respectively corresponding to the first striker and the second striker and configured to be coupled to or released from the first striker or the second striker, wherein the handle assembly and the dual latch are spaced apart from each other when the half door is opened.

2. The two-stage open tailgate according to claim 1, wherein the dual latch comprises:
    a first pawl selectively coupled to the first striker, the first pawl comprising a first protrusion configured to operate in linkage with the first operation of the handle assembly; and
    a second pawl selectively coupled to the second striker, the second pawl comprising a second protrusion configured to operate in linkage with the second operation of the handle assembly.

3. The two-stage open tailgate according to claim 2, wherein the handle assembly comprises:
    a connector having a first end fixed to the half door, the connector configured to be rotated during the first operation;
    a first rotator configured to contact the connector at a second end of the connector, the first rotator configured to be rotated during the first operation; and
    a first link connected to one end of the first rotator, wherein the first link is configured to operate in linkage with rotation of the first rotator.

4. The two-stage open tailgate according to claim 3, wherein:
    the first rotator is configured to rotate in linkage with rotation of the connector during the first operation of the handle assembly; and
    the first link is configured to apply tension to the first protrusion in accordance with the rotation of the first rotator.

5. The two-stage open tailgate according to claim 3, wherein:
    the first striker is configured to be released from the first pawl during the first operation of the handle assembly to open the half door; and
    the first protrusion is spaced apart from the first link and the second protrusion is spaced apart from a second link in a state in which the first striker is released from the first pawl.

6. The two-stage open tailgate according to claim 2, wherein the handle assembly comprises:
    a connector having a first end fixed to the half door, the connector configured to be rotated during the second operation;
    a second rotator configured to contact the connector at a second end of the connector, the second rotator configured to be rotated during the second operation; and
    a second link connected to one end of the second rotator, wherein the second link is configured to operate in linkage with rotation of the second rotator.

7. The two-stage open tailgate according to claim 6, wherein:
    the second rotator is configured to rotate in linkage with rotation of the connector during the second operation of the handle assembly; and
    the second link is configured to apply tension to the second protrusion in accordance with the rotation of the second rotator.

8. The two-stage open tailgate according to claim 6, wherein:
    the second striker is configured to be released from the second pawl during the second operation of the handle assembly; and
    the first protrusion is configured to contact a first link, and the second protrusion is configured to contact the second link in a state in which the second striker is released from the second pawl to open the full door.

9. A vehicle comprising:
    a vehicle body;
    a half door;
    a handle assembly disposed at an outer surface of the half door, wherein the half door is configured to be opened when the handle assembly performs a first operation;
    a full door disposed at a rear surface of the half door, the full door configured to be opened in an integrated state with the half door when the handle assembly performs a second operation;
    a first striker mounted to one end of the half door;
    a second striker mounted to the vehicle body, wherein the second striker is disposed adjacent to the first striker in a closed state of the half door; and
    a dual latch formed at one end of the full door at positions respectively corresponding to the first striker and the second striker, the dual latch configured to be coupled to or released from the first striker or the second striker, wherein the handle assembly and the dual latch are spaced apart from each other when the half door is in an opened state.

10. The vehicle according to claim 9, wherein the dual latch comprises:
    a first pawl selectively coupled to the first striker, the first pawl comprising a first protrusion configured to operate in linkage with the first operation of the handle assembly; and
    a second pawl selectively coupled to the second striker, the second pawl comprising a second protrusion configured to operate in linkage with the second operation of the handle assembly.

11. The vehicle according to claim 10, wherein the handle assembly comprises:
a connector having a first end fixed to the half door, the connector configured to be rotated during the first operation;
a first rotator configured to contact the connector at a second end of the connector, the first rotator configured to be rotated during the first operation; and
a first link connected to one end of the first rotator, wherein the first link is configured to operate in linkage with rotation of the first rotator.

12. The vehicle according to claim 11, wherein:
the first rotator is configured to rotate in linkage with rotation of the connector during the first operation of the handle assembly; and
the first link is configured to apply tension to the first protrusion in accordance with the rotation of the first rotator.

13. The vehicle according to claim 11, wherein:
the first striker is configured to be released from the first pawl during the first operation of the handle assembly to open the half door; and
the first protrusion is spaced apart from the first link and the second protrusion is spaced apart from a second link in a state in which the first striker is released from the first pawl.

14. The vehicle according to claim 10, wherein the handle assembly comprises:
a connector having a first end fixed to the half door, the connector configured to be rotated during the second operation;
a second rotator configured to contact the connector at a second end of the connector, the second rotator configured to be rotated during the second operation; and
a second link connected to one end of the second rotator, wherein the second link is configured to operate in linkage with rotation of the second rotator.

15. The vehicle according to claim 14, wherein:
the second rotator is configured to rotate in linkage with rotation of the connector during the second operation of the handle assembly; and
the second link is configured to apply tension to the second protrusion in accordance with the rotation of the second rotator.

16. The vehicle according to claim 14, wherein:
the second striker is configured to be released from the second pawl during the second operation of the handle assembly; and
the first protrusion is configured to contact a first link, and the second protrusion is configured to contact the second link in a state in which the second striker is released from the second pawl to open the full door.

17. A method of operating a two-stage open tailgate, the method comprising:
disposing a handle assembly at an outer surface of a half door;
disposing a full door at a rear surface of the half door;
mounting a first striker to one end of the half door;
mounting a second striker to a vehicle body such that the second striker is disposed adjacent to the first striker in a closed state of the half door;
forming a dual latch at one end of the full door at positions respectively corresponding to the first striker and the second striker, wherein the dual latch is capable of being coupled to or released from the first striker or the second striker;
performing a first operation of the handle assembly, wherein the half door is opened by the first operation; and
performing a second operation of the handle assembly, wherein the full door is opened with the half door in an integrated state by the second operation.

18. The method according to claim 17, further comprising:
wherein the dual latch comprises:
selectively coupling a first pawl of the dual latch to the first striker, wherein the first pawl comprises a first protrusion operating in linkage with the first operation of the handle assembly; and
selectively coupling a second pawl of the dual latch to the second striker, wherein the second pawl comprises a second protrusion operating in linkage with the second operation of the handle assembly.

19. The method according to claim 18, wherein the handle assembly comprises a connector having a first end fixed to the half door, a first rotator contacting the connector at a second end of the connector, and a first link connected to one end of the first rotator, the method further comprising:
rotating the connector and the first rotator, and the first link during the first operation;
operating the first link in linkage with rotation of the first rotator;
applying tension by the first link to the first protrusion in accordance with the rotation of the first rotator; and
releasing the first striker is from the first pawl during the first operation of the handle assembly to open the half door, wherein the first protrusion is spaced apart from the first link and the second protrusion is spaced apart from a second link when the first striker is released from the first pawl.

20. The method according to claim 18, wherein the handle assembly comprises a connector having a first end fixed to the half door, a second rotator configured to contact the connector at a second end of the connector, and a second link connected to one end of the second rotator, the method further comprising:
rotating the connector and the second rotator during the second operation;
operating the second link in linkage with rotation of the second rotator;
applying tension by the second link to the second protrusion in accordance with the rotation of the second rotator; and
releasing the second striker from the second pawl during the second operation of the handle assembly to open the full door, wherein the first protrusion is contacts a first link and the second protrusion contacts the second link when the second striker is released from the second pawl.

* * * * *